United States Patent Office 3,009,872
Patented Nov. 21, 1961

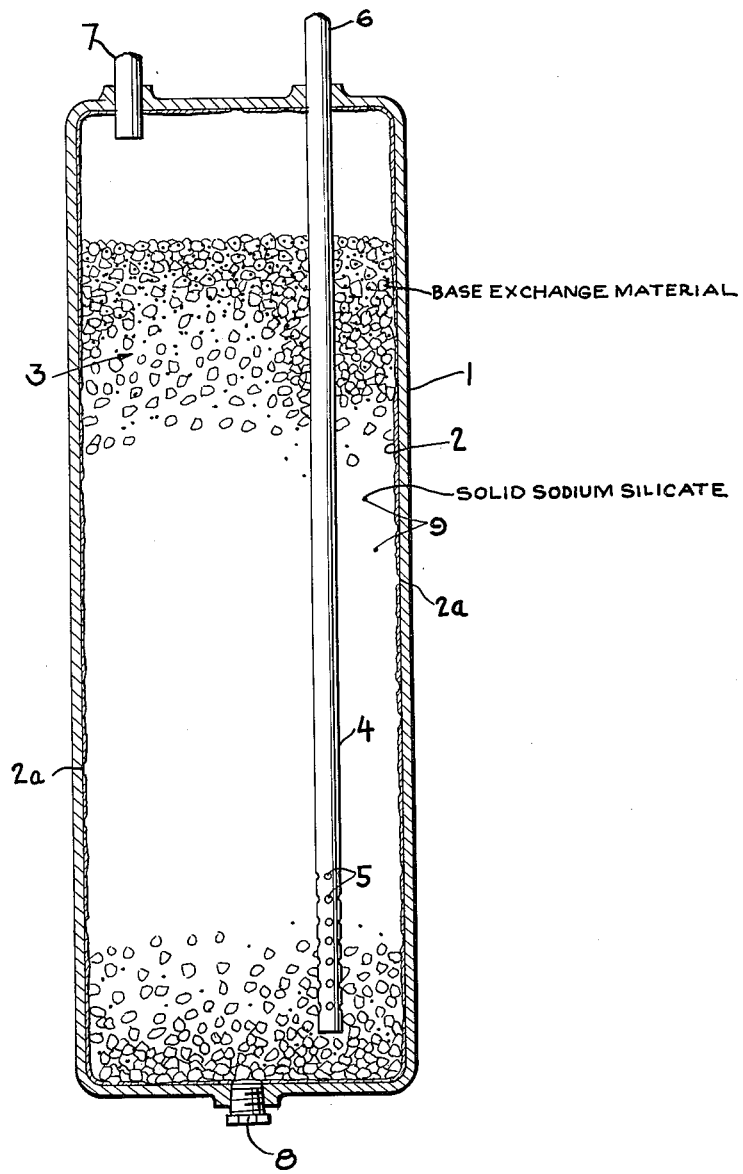

3,009,872
WATER SOFTENING
Foster Dee Snell, New York, and Lloyd I. Osipow, Monsey, N.Y., assignors to Foster D. Snell, Inc., New York, N.Y., a corporation of New York
Filed Dec. 1, 1958, Ser. No. 777,299
5 Claims. (Cl. 210—29)

This invention relates to water softening by base-exchange materials and the units in which they are used. In particular, it is directed to decreasing the corrosion of metallic vessels which contain the base-exchange material. The application is a continuation-in-part of our previous copending applications Serial Nos. 399,146 and 399,147 both filed December 18, 1953, and both now abandoned.

The detrimental effects of hard waters have given rise to an ever increasing number of water softening installations using ion-exchange material. Such water softening systems have been installed, not only in industrial plants, but also in homes and small-sized business establishments, such as laundries, laundromats, dry-cleaning establishments, etc. Many installations of such small-sized water softening systems are now being provided on a rental or service basis by organizations which install and maintain a system in operation. In such types of installations, the tank containing the exhausted ion-exchange material is removed bodily from the premises and replaced by another tank containing a charge of regenerated ion-exchange material. The exhausted tank is then taken to a central point for regeneration. The operations of "tank-out" and "tank-in" servicing is akin to that, for example, of "bottled gas" services. The base-exchange materials usually employed for water-softening in such systems have been the zeolites. The zeolites, either natural or manufactured, are hydrous aluminum sodium silicates. They exist as porous granules which are capable of exchanging the sodium of the zeolite molecule for the calcium or magnesium or other polyvalent metallic ions contained in the water to be softened. When all, or nearly all, of the sodium of the zeolite has been yielded up, the exhausted zeolites are then regenerated into the sodium form by the action thereon of sodium chloride solution. Customarily, the regeneration is effectuated by the action of a brine containing at least 8 percent of sodium chloride, preferably 15–17 percent, sometimes saturated. Before regeneration of the exhausted base-exchange material it is blown out of the tank into a conveniently disposed receptacle where the base-exchange material is agitated in water to break up agglomerations and washed to remove accumulations of mud or mud-like deposits. Regeneration is then accomplished by circulating brine through the ion-exchange material, after which the regenerated material is washed with water to remove residual brine and recharged into the tank.

The natural and synthetic zeolites were the first base-exchange materials utilized. Recent developments have made available resins for water-softening possessing the ion-exchange properties of the zeolites. A resin base-exchange material is one in which the anionic portion of the molecule is an organic residue of resinous character. Among such resins are the sodium salts of sulfonated copolymers of styrene and divinyl benzene. Such organic base-exchange materials function similarly to the zeolites, in that they strip the calcium or magnesium or other polyvalent metallic ions from the water and yield in place thereof the sodium ions. Exhausted resin base-exchange materials are regenerated similarly to exhausted zeolites by the action of brine. The base-exchange resins are particularly advantageous in comparison with the zeolites because for a given volume the softening capacity approximates 50 percent more than that of the best zeolite. They are rated on a basis of the number of grains of hardness they can take up per cubic foot. The usual weight is about 50 pounds per cubic foot.

However, the water softening systems of the base-exchange type are beset by corrosion of the metallic tank in which the base-exchange material is contained. Where the water softening system is installed and maintained in operation by the householder himself, he has the burden of regenerating the exhausted base-exchange material as well as coping with the tank corrosion problem. In the case of the rental or service type of system, it is the owner of the system who has to cope with the leakage of the tank. In the latter type of operation, the corrosion problem is one of great severity. The movement of the tanks from point-of-use to the regenerating plant, and the return of the tank with a charge of regenerated base-exchange material to another point-of-use, and the repetition of such cycles, causes dislodgment of the accumulated rust, etc., with a consequent weakening of the tank. Thus, the life of the tank is shortened, and the cost of replacing the same is a substantial economic factor. Failure of tanks due to corrosion whether in the home or a commercial establishment, usually takes place by perforation of the tank, permitting a jet of water under pressure to wet the surrounding area. With laundry equipment, play rooms, game rooms, etc. often located in the vicinity, this is a cause of substantial damage for which the service operator is held liable. The cost of replacing the tank by the home owner who maintains and operates his own system is likewise an economic burden on him, and may be a source of damage from which he has no recourse.

As has been stated, the exhausted base-exchange material is customarily blown out of the tanks. In many designs such blowouts are accomplished by means of air pressure or hydrostatic pressure, etc. Accordingly, the lower specific gravity of the resinous base exchangers is a feature which would make them particularly attractive for use in domestic water softening installations. The lesser weight of resin-type base-exchange material is also a factor favoring its use.

Even though the zeolites produce substantial corrosion of the tanks, the resin base-exchange material produces far greater corrosion. Indeed, the rate of corrosion caused by base-exchange resin is so high that their use has been limited in rental-service tanks despite the advantages that are contributed by their greater volumetric capacity.

Much thought has been given to the problem of drastically suppressing the corrosion rate resulting from the base-exchange materials. We have discovered that it is practical to decrease the rate of corrosion of the tanks by incorporation therein of granular sodium silicate as more fully described hereafter and maintaining the base-exchange material spaced from and out of physical contact with the metal walls of the tanks. In general, this procedure shows very little advantage in small scale laboratory tests but surprisingly substantial advantage in practical scale use.

Accordingly, it is among the principal objects of this invention to provide a novel means for drastically suppressing the corrosive action of base-exchange zeolites and resins, on the metallic tanks, in which they are contained in water softening systems, so that such base-exchange zeolites and resins may be utilized with marked diminution in cost of operating the water softening systems.

Another object of the invention is to provide as an article of manufacture a base-exchange water-softening tank containing a base-exchange material and a soluble corrosion inhibitor in solid form therein of sufficiently controlled solubility to make the water passing through the tank substantially less corrosive during the entire period between each regeneration of the base-exchange material therein.

Another object of the invention is to provide a method and means for automatically dosing water passing through a bed of base-exchange material with a sodium silicate corrosion inhibitor in sufficient amount to render the water substantially less corrosive, without the requirement for mechanical proportioning devices, feeders or the like for feeding the silicate into the water.

Another object of the invention is to provide a method of charging a bed of base-exchange material with sufficient solid anhydrous sodium silicate of controlled solubility to render water passing through the bed of base-exchange material substantially less corrosive during the useful life of said base-exchange material between regenerations of the base-exchange material.

Another object of the invention is to provide an economical method of keeping the base-exchange material spaced from the walls of the water-softening tanks.

Various other objects and advantages of our invention will appear as this description proceeds.

We have found that the foregoing objects, as well as other objects and advantages, can be achieved by incorporating in the granular mass of the porous base-exchange material in the base-exchange tanks a small quantity of granulated anhydrous sodium polysilicate distributed uniformly therethrough and keeping the base-exchange material spaced from the walls of the tanks.

The use of a liquid silicate as a corrosion protection is not new. On the contrary, there have been and are in use many proportioners, which feed liquid sodium silicate into water lines for protection of such lines. In those cases, however, the large installation permits of such a cost. In the service tanks, referred to herein, it would be prohibitive to attach such a feeder to each one, as they are in use in over a million households in the United States alone. So far, as they are serviced on a rental basis, the operators have, for years, suffered such corrosion and the loss from it rather than make the capital investment in liquid-silicate feeding devices. The present invention makes the investment in such feeders and the mechanical troubles accompanying their use entirely unnecessary and yet provides for a continuous maintenance of dissolved sodium silicate in the water going through the tanks and into the household water system.

We found, further, that the objectives of this invention could not be accomplished by any commercial sodium silicate. Therefore, as a result of research, we found that what is known as an anhydrous 1:2 sodium silicate glass, which means one part of sodium oxide to two parts of silicon dioxide, would give the desired result if used at 4–30 mesh. It was necessary for the solution of our problem to first find a sodium silicate having a ratio of $Na_2O$ to $SiO_2$ which would give a low rate of solution but would not be insoluble in cold water and to then find the particle size range which would insure maintenance of sufficient solid sodium silicate in the base-exchange material in the tanks to supply dissolved sodium silicate to the water passing through the tanks throughout the periods in which the tanks were in use between regenerations. The particle size which will accomplish this result will vary some with the temperature of the water and the rate of water flow through the tank but in general should be between 4 and 200 mesh, without dust, and for water-softening systems operating on tap water a particle size of 4 to 30 mesh is preferred.

The necessary $Na_2O:SiO_2$ ratio is typified by Philadelphia Quartz Company SSC brand sodium silicate but the mesh distribution is not. We have found that the distribution of such a silicate, in granulated form, in the amount of about from 0.03 percent to 0.30 percent throughout the bed of the base exchanger produces a significant suppression of corrosion.

In use it is usual to add 0.5–2 oz. of the silicate for each 1½ cubic foot of base-exchange material to each tank, when the regenerated base-exchange material is reinserted in the tank. The use of such particle size selection of the solid sodium silicate of the specified ratio gives an amount of the dissolved sodium silicate of the order of 50–100 p.p.m. through the normal life of the base-exchange material between each regeneration. In a normal household, the capacity of a tank is 20,000 grains of hardness, which will average as servicing with soft water for 30 days. This, theoretically, will suffice for softening 2,000 gallons of water of ten-grain hardness passing through the tank, but under actual practice a considerably lesser amount is softened. The amount of solid anhydrous sodium silicate added is sufficient to provide from 50 to 100 p.p.m. of dissolved sodium silicate in this amount of water and the rate of solution is such as to provide a supply of solid sodium silicate in the tank sufficient to last for the major part of the period between regenerations. The grain size and ratio of sodium oxide to silicon dioxide which influences the solubility are so selected as to last for most of that period, frequently with some residual material carrying over to the next period after regeneration. This very minor amount of addition of sodium silicate to the water supply not only protects the tank, containing the base-exchange resin or zeolite, but also the piping, hot-water heater, if any, and other plumbing units of the water user. If the water passing through the tank is unusually cold, as for example from a low-temperature ground water, we use a silicate containing more fine material, typical being 14–200 mesh without dust.

The addition of such specific type of sodium silicate can be made without expensive proportionating equipment and automatically reduces the householder's and the service man's corrosion problems to an extent which more than offsets the slight additional cost of the solid sodium silicate treatment.

FIG. 1 is a diagrammatical illustration of a typical household water softening tank installation.

As shown in the drawing the tank is indicated at 1, a porous coating 2 lines the inside of the tank and keeps the granular base-exchange material 3 from contact with the walls of the tank. Pores in the coating are indicated at 2a. The outlet tube 4 is provided with perforations 5 toward the bottom thereof through which water which has passed through the base-exchange material 3 enters the outlet tube 4. The outlet 6 is normally provided with a union connection (not shown) by which the softened water outlet tube 4 may be readily connected to and disconnected from the household water system and the inlet 7 is similarly provided with a union connection by which the tank 1 may be readily connected to and disconnected from the water supply pipe. The granular sodium silicate distributed through the base-exchange material is indicated at 9 and a screw plug 8 is provided in the bottom of the tank.

In regenerating the base-exchange material the tanks which have been removed from the water supply system are taken to the central servicing depot and the base-exchange material 3 is blown out or discharged from the tank by reverse flow of water or air through the outlet opening 6 which discharges the material from the inlet opening 7 into a convenient regeneration and washing tank and after regeneration and washing, the base-exchange material is recharged into the tank together with the required amount of solid sodium silicate through the inlet opening 7.

The following are illustrative examples of the present invention:

These examples are the results of operations in the field by operators who supply and service water-softening units. These soft water service operators were supplied with anhydrous 1:2 sodium silicate glass, 4–14 mesh, and instructions for its use. Each time a unit was returned for servicing—every two to four weeks—the operators added one to two ounces of the silicate glass for 1½ cubic feet of ion exchanger. The silicate glass was generally added near the top of the exchange unit. The operators ordinarily keep a dated record of the number of tanks which leak, as the result of corrosion.

The operator can tell whether a corrosion inhibitor is effective by observing whether there has been a significant reduction in the number of leakers after use of the treatment.

EXAMPLE 1

A water service operator in Ohio using 4,500 service tanks with synthetic zeolite (gel) and 3,500 service tanks with resin-type base-exchange material supplied approximately 2 ounces of the above-described anhydrous 1:2 sodium silicate glass, 4–14 mesh, for each 1½ cubic foot of base-exchange material to each tank when regenerated. His records show a reduction in leakers of about 50 percent over a period of several months.

EXAMPLE 2

A water service operator operating 1,000 gel tanks and 750 resin tanks in New York State fortified with 2 ounces of sodium silicate similar to Example 1 over a period of two months likewise found a 50 percent reduction in leakers. Another operator in the same state in three months reported 75 percent reduction in leakers.

EXAMPLE 3

One operator in Nebraska has not had any problem with corrosion perforating his tanks. However, he does receive complaints of red water. When this happens, his procedure is to brush out the rust in the hot water heater. He has been using the treatment of this invention, the addition of 2 ounces of anhydrous 1:2 sodium silicate glass (4–30 mesh) for each 1½ cubic foot of base-exchange material, for five months. During this period he has noted a striking improvement in the amount of rust settling in the water heaters beyond the ion-exchanger. In almost all cases, the water is now clear.

We have also discovered that it is possible to still further decrease the corrosion rate of steel or galvanized-iron base exchange water softening tanks, and thereby to increase the life thereof, by physically separating the porous base-exchange material from the walls of the tank and at the same time admixing with the exchange material the granular sodium silicate described above. This combination not only is valuable in markedly diminishing the corrosion effects of the zeolites, but likewise markedly diminishes the corrosive action of the base-exchange resin. The marked diminution of the corrosive effect of the latter now makes it possible to employ the base-exchange resin in installations where their severe corrosive effect has militated against the use thereof.

Methods for maintaining the base exchangers out of physical contact with the metallic tank include the application of suitable organic and inorganic protective coatings to the tank which need not completely cover the walls of the tank as well as placing the exchange resins in porous bags which are then placed in the tank.

The following are illustrative examples of this embodiment of our invention:

EXAMPLE 4

The laboratory apparatus (model water-softening units) used for these experiments, consisted of 4-ounce glass jars, each fitted with glass inlet and outlet tubes. Each glass jar was filled with ion-exchange resin, sufficient water to cover the resin and a metal panel. Where sodium silicate glass was employed in the experiments, the silicate glass was mixed intimately with the resin before use. Water flowing through the glass entered near the bottom of the jar containing the resin and egressed from the top of the jar. In all experiments, New York City tap water flowed through the jars at the rate of 75 cubic centimeters per minute for a period of eight hours. The water in the jars then remained quiescent for 16 hours. The experiment was continued in this manner for two weeks, after which the metal panels were removed from the jars and the extent of corrosion was determined. All tests were conducted using SAE 1010 steel. The panels were thoroughly cleaned by scrubbing with steel wool and trichlorethylene, followed by rinsing in hot trichlorethylene and acetone. The panels were weighed and then coated or used "as is" for the corrosion tests. In all cases, the test panels were placed vertically in the center of the jars. After completion of the corrosion test, coatings were stripped from the test panels and the corrosion products were removed by immersing the panels for 2½ minutes in a boiling 10 percent solution of ammonium citrate in water. The panels were then rinsed in water, acetone and ether. After air-drying, they were reweighed.

The sodium silicate glass used in these experiments was an anhydrous glass ($Na_2O:SiO_2=1:2.00$), pulverized and sieved to give particles of 8 to 20 mesh. Where the silicate glass was employed, it was intimately mixed with the resin in the ratio of 250 milligrams of solid silicate glass to 4 fluid ounces of wet resin. The resin employed was a polystyrene-type, cation-exchange resin (Amberlite IR–120).

Coatings employed in these tests follow:

(a) *Lacquer*

| | Parts by weight |
|---|---|
| Chlorinated natural rubber, approx. 67% chlorine (Parlon), 125 cps | 22 |
| Chlorinated terphenyl, approx. 60% chlorine (Arochlor 5460) | 8 |
| Chlorinated biphenyl, approx. 54% chlorine (Arochlor 1254) | 5 |
| Chlorinated biphenyl, approx. 60% chlorine (Arochlor 1260) | 5 |
| Toluene | 80 |

The chlorinated rubber exhibits a viscosity between 115 and 180 centipoises (average 125) when dissolved in toluene to a concentration of 20% by weight at 25° C.

The panels were coated with the lacquer by dipping, and then air-dried to give a coating approximately 2 mils thick.

(b) *Hot melt*

| | Parts by weight |
|---|---|
| Hydroabietyl alcohol, technical (Hydrolyn A) | 40 |
| Polyvinyl butyral resin (Butacite VF7200) | 10 |
| Glycerol ester of hydrogenated resin (Staybelite Ester No. 10) | 20 |

The polyvinyl butyral resin has an intrinsic viscosity between 0.81 and 1.16.

The panels were dip-coated at 170° C. and then cooled to give a coating approximately 40 mils thick.

(c) *Cotton cloth*

Panels were wrapped in a single thickness of Indianhead cotton cloth. Experimental results follow:

MODEL WATER SOFTENING UNIT

| Metal Covering | Silicate Glass Present | Corrosion (inches per year) |
|---|---|---|
| Lacquer | No | 0.069 |
| Do | Yes | 0.048 |
| Hot Melt | No | 0.021 |
| Do | Yes | 0.016 |
| Cotton Cloth | No | 0.635 |
| Do | Yes | 0.472 |
| None | No | 1.13 |

The results in this laboratory experiment do not correspond quantitatively with the more favorable results in the field. They do establish in a quantitative way that the protection is greater when the coated tanks and sodium silicate are used together. Field results are more significant but detailed losses of weight cannot be given. We are aware that complete protective plastic coatings have been used in base-exchange water softening tanks as shown, for example, in U.S. Patent No. 2,670,328. The application of a single coat of the lacquer or hot melt to an already fabricated and used tank is not, however, to be confused with commercial applications of multiple coats of corrosion resistant material, such as vinyl coatings, to give complete protection to the tank. Such completely protected coated tanks are normally too expensive for use in household water softening installations. With a single dip coat as used in our invention minute "holidays," pits or perforations are considered to be unavoidable and permit the treated water in the tank to contact the walls of the tank through such "holidays," pits or perforations. The single dip coat which we use is sufficient, however, to prevent actual physical contact of the granular base exchange particles with metal walls of the tank.

The examples which follow are the results of operators who supply and service water softening units. These soft water service operators were supplied with anhydrous 1:2 sodium silicate glass, 4–14 mesh, and instructions for its use. They were also supplied with the lacquer of Example 4 which they applied as a single coat under improvised conditions in their own shops. The coats were necessarily imperfect and left "holidays" or pits but were sufficient to keep the base-exchange material spaced from the walls of the tanks.

Each time a unit was returned for servicing—every two to four weeks—the operators added one to two ounces of the silicate glass of the 1:2 ratio for each 1½ cubic feet of ion exchanger. The silicate glass was generally added near the top of the exchange unit. The operators ordinarily keep a dated record of the number of tanks which leak, as the result of corrosion. They can tell whether a corrosion-inhibitor is effective by observing whether there has been a significant reduction in the number of leakers after use of the treatment. Operators who place their ion-exchanger in cloth bags, which are then inserted in the metal tanks, can also observe staining of the bags by rust.

EXAMPLE 5

An operator in New Jersey who placed his ion-exchange material (resin) in cloth bags in his tanks found that in the operation of 500 of such tanks there was no longer staining of the cloth bags.

EXAMPLE 6

An operator in Tennessee operating with 150 synthetic zeolite units and 1500 synthetic resin base-exchange units in which the walls of the tanks were coated with the lacquer of Example 4, found that during a period of eight months his leakers were reduced by eighty percent. That is a greater reduction of leakers than was reported by any operator using the granular polysilicate alone. Of the operators keeping the best statistical records on large numbers of tanks the reduction in leakers by using sodium polysilicate alone is about fifty percent.

EXAMPLE 7

One operator in Tennessee had been experiencing ten to fifteen leakers per week. He took 150 of the tanks which had not developed into leakers and coated them with a lacquer coating of Example 4. After three to four months the tanks which had thus been coated began to fail quickly. He then began to use the glassy polysilicate in conjunction with tanks that had been coated with the lacquer described in Example 4. Thus, in the following four months the latter tanks developed very few leakers.

It will be understood that the foregoing description of the invention and the examples set forth above are merely illustrative of the principles thereof, and, accordingly, that the appended claims are to be construed as defining the invention within the full spirit and scope thereof.

We claim:
1. As a product of manufacture a base-exchange tank for a water-softening system subject to corrosion under conditions of use, a bed of granular base-exchange material in said tank, particles of solid anhydrous sodium silicate having an $Na_2O$ to $SiO_2$ ratio of 1 to 2 and a particle size range of 4 to 200 mesh distributed through said bed of granular base-exchange material in said tank in the amount of from 0.03 to 0.30 percent based on the weight of said base-exchange material whereby solid soluble sodium silicate is maintained in contact with water passing through said tank substantially throughout the period between regenerations of said base-exchange material and water inlet and outlet connections to said tank.

2. As a product of manufacture a base-exchange tank for a water-softening system subject to corrosion under conditions of use, a bed of granular base-exchange material in said tank, particles of solid anhydrous sodium silicate having an $Na_2O$ to $SiO_2$ ratio of 1 to 2 and a particle size range of 4 to 14 mesh distributed through said bed of granular base-exchange material in said tank in the amount of from 0.03 to 0.30 percent based on the weight of said base-exchange material whereby solid soluble sodium silicate is maintained in contact with water passing through said tank in sufficient amount to provide 50 to 100 p.p.m. of dissolved sodium silicate in said water substantially throughout the period between regenerations of said base-exchange material and water inlet and outlet connections to said tank.

3. The method of protecting base-exchange water-softening tanks subject to corrosion under conditions of use and other apparatus in a base-exchange water-softening system from corrosion which comprises incorporating into the base-exchange water-softening material contained in the base-exchange tanks sufficient solid anhydrous sodium silicate having a ratio of $Na_2O$ to $SiO_2$ of 1 to 2 and a particle size between 4 and 200 mesh to maintain 50 to 100 p.p.m. of dissolved sodium silicate in the water passing through said system substantially throughout the period of the normal useful life of the water-softening base-exchange material between regenerations thereof.

4. The method of suppressing the corrosion effects of base-exchange materials in a water-softening installation which comprises distributing through the bed of the base-exchange material from 0.03 percent to 0.3 percent of solid anhydrous sodium silicate having an $Na_2O$ to $SiO_2$ ratio of 1:2 in a particle size range such as to continue to supply dissolved sodium silicate to the water passing through the base-exchange material in the amount of 50 to 100 p.p.m. substantially throughout the period between regenerations of the base-exchange material.

5. The method of claim 4 in which the solid anhydrous sodium silicate is in a particle size range between 4 and 200 mesh.

References Cited in the file of this patent

UNITED STATES PATENTS

| 2,560,331 | Buchan | July 10, 1951 |
| 2,670,328 | Webb | Feb. 23, 1959 |

FOREIGN PATENTS

| 488,149 | Canada | Nov. 18, 1952 |

OTHER REFERENCES

Stericker: "Protection of Small Water Systems from Corrosion," Industrial and Engineering Chemistry, August 1945, pages 716–721. (Pages 116 and 717 are relied on.)